(12) United States Patent
Verhaegh et al.

(10) Patent No.: US 8,122,469 B2
(45) Date of Patent: Feb. 21, 2012

(54) ASSISTED USER CONTROL IN RECOMMENDERS

(75) Inventors: Wilhelmus Franciscus Johannes Verhaegh, Heusden Gem. Asten (NL); Srinivas Gutta, Bangalore (IN); Serverius Petrus Paulus Pronk, Vught (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1242 days.

(21) Appl. No.: 11/813,349

(22) PCT Filed: Jan. 24, 2006

(86) PCT No.: PCT/IB2006/050259
§ 371 (c)(1),
(2), (4) Date: Jul. 5, 2007

(87) PCT Pub. No.: WO2006/079974
PCT Pub. Date: Aug. 3, 2006

(65) Prior Publication Data
US 2009/0125937 A1 May 14, 2009

Related U.S. Application Data

(60) Provisional application No. 60/647,574, filed on Jan. 27, 2005.

(51) Int. Cl.
G06F 3/00 (2006.01)
H04H 60/33 (2008.01)
(52) U.S. Cl. .................... 725/46; 725/9; 725/13
(58) Field of Classification Search .............. None
See application file for complete search history.

(56) References Cited

U.S. PATENT DOCUMENTS

| | | | |
|---|---|---|---|
| 5,977,964 A * | 11/1999 | Williams et al. | 715/721 |
| 6,727,914 B1 | 4/2004 | Gutta | |
| 7,051,352 B1 | 5/2006 | Schaffer | |
| 2002/0104087 A1* | 8/2002 | Schaffer et al. | 725/46 |
| 2003/0233655 A1* | 12/2003 | Gutta et al. | 725/46 |
| 2003/0237087 A1* | 12/2003 | Kurapati et al. | 725/9 |
| 2005/0022239 A1* | 1/2005 | Meuleman | 725/46 |

* cited by examiner

*Primary Examiner* — Kristine Kincaid
*Assistant Examiner* — Chris Parry

(57) ABSTRACT

A method and arrangement for modifying settings of a television program recommender displays the rating (recommended or not recommended) for a selected television program, and also displays icons for selection by the user to indicate whether the user agrees or disagrees with the recommendation. The television program recommender then updates its settings based on the user's icon selection. In addition, if the user indicates that he/she disagrees with the recommendation, the television program recommender determines and displays the number of times that the user needs to indicate his/her desires with respect to the selected television program in order for the recommendation to agree with the user's desires.

4 Claims, 4 Drawing Sheets

SHOW: THE SOPRANOS

ACTOR: JAMES GANDOLFINI

NO. OF TIME TO BE RECOMMENDED:

308 ⟶ 10

ASSISTED USER CONTROL IN RECOMMENDERS

The subject invention relates to recommenders for recommending programs for viewing by a user.

In recommender technology, often a distinction is made between explicit and implicit recommenders. In an explicit recommender, a user explicitly inputs his/her preferences for different categories of content. For instance, he/she can indicate that he/she likes action movies very much by giving the genre "action move" a high score, and that he/she dislikes a particular channel by giving it a low (or negative) score. Then, for a new program, the scores of the categories are combined to determine a recommendation score. In an implicit recommender, the user does not give the feature scores him/herself, but rather, a learning system is used that derives them from training examples (programs that the user has liked or disliked).

The main advantage of an explicit recommender is that the user is in full control. The main advantage of an implicit recommender is that the system is easy to use.

While an implicit recommender is simple to use, the user often wants to have more control over the system.

It is an object of the invention to give a user assistance in setting up an implicit recommender.

This object is achieved in a method for controlling a program recommender, comprising the steps of generating and storing parameter profiles concerning a user's likes and dislikes in programming; calculating a rating for a selected program based on said parameter profiles in said various categories; determining a recommendation indicating whether or not said selected program is recommended based on said rating; displaying said recommendation; enabling a user to select whether a desire of said user agrees with said recommendation; modifying said parameter profiles based on said user's selection; and if said user's desire differ from said recommendation, determining and displaying a number of times the user needs to indicate said desire for said selected program in order for said program recommender to conform said recommendation to the desire of said user.

This object is further achieved in an arrangement for controlling a program recommender, comprising means for generating and storing parameter profiles in various categories concerning a user's likes and dislikes in programming; means for calculating a rating for a selected program based on said parameter profiles in said various categories; means for determining a recommendation indicating whether or not said selected program is recommended based on said rating; means for displaying said recommendation; means for enabling a user to select whether a desire of said user agrees with said recommendation; means for modifying said parameter profiles based on said user's selection; and means for determining and displaying a number of times the user needs to indicate said desire for said selected program, if said user's desire differ from said recommendation, in order for said program recommender to conform said recommendation to the desire of said user.

With such a method and arrangement, the user is informed how his/her desires with regard to selected programs will affect whether the selected program will or will not be recommended, in that the user now knows how many time the user needs to indicate his/her desires for the selected program in order for the program recommender to generate a recommendation in accordance with the user's desires.

In a particular embodiment, the user is enabled to instantaneously indicate said desire for said selected program for said number of times.

As such, the user is spared the task of repeatedly entering his/her desires for the selected program for the indicated number of times.

With the above and additional objects and advantages in mind as will hereinafter appear, the invention will be described with reference to the accompanying drawings, in which.

Figure 1:
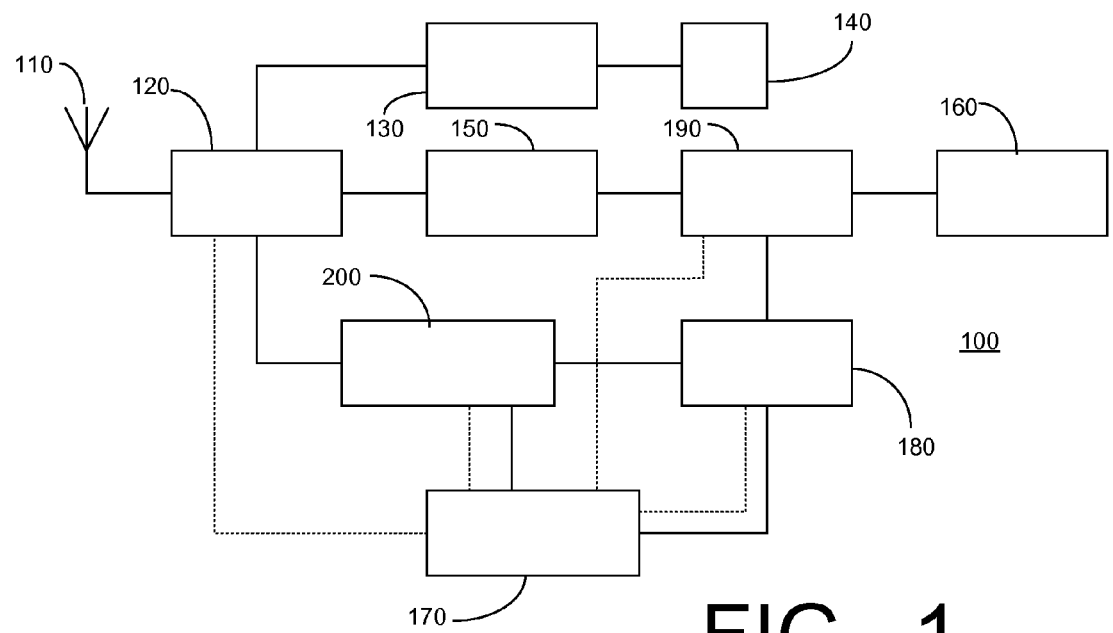
FIG. 1 is a block schematic diagram of a television receiver incorporating the invention.

FIG. 1 shows a block schematic diagram of a television receiver 100 incorporating the subject invention. The television receiver 100 receives and displays television programs originating from a source. In this example, an antenna 110 is shown as the source. However, it should be understood that the television programs may originate from any of a plurality of sources, e.g., a set-top box, a DVD player, satellite, etc. A tuner 120 is shown connected to the antenna 110 for tuning to a particular channel carrying a desired television program. The tuner 120 supplies audio signals to an audio signal processor 130 which sends corresponding sound signals to a loudspeaker 140. In addition, the tuner 120 supplies video signals to a video signal processor 150 which supplies corresponding display signals to a display 160. A controller 170 controls the operation of the tuner 120 as well as the audio and video signal processors 130 and 150. The controller 170 further provides control signals to an on-screen display (OSD) processor 180 which generates an OSD signal for displaying various graphical symbols on the display 160. This OSD signal is supplied to a video switch 190 along with the display signals from the video signal processor 150 for superimposing the graphical symbols onto the displayed images represented by the display signals.

The television receiver 100 further includes a television program recommender 200 for recommending television programs for the user. The television program recommender 200 may be connected to a database containing information concerning television programs being transmitted or to be transmitted in the future. This is shown in FIG. 1 as a connection to the tuner 120 for receiving meta-data transmitted with the television signals in the form of, for example, an electronic programming guide (EPG).

Figure 2:
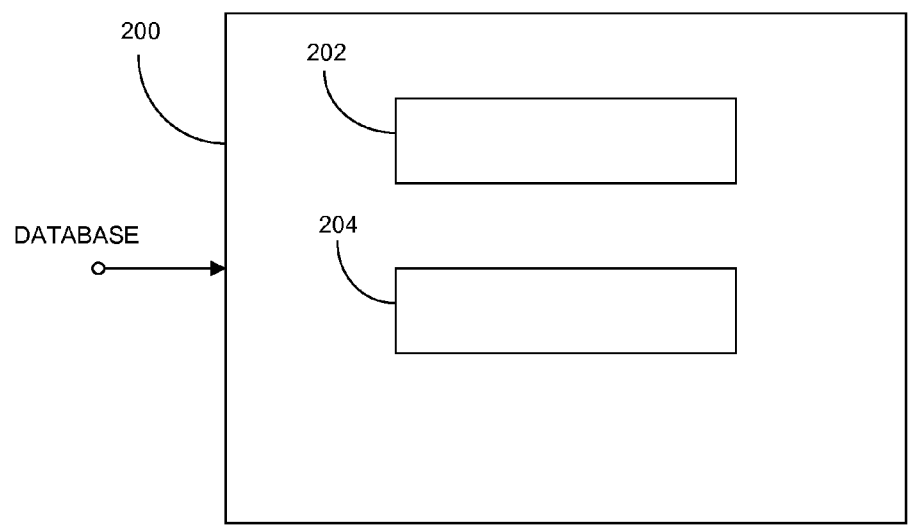
FIG. 2 is a block diagram of a television program recommender.

As shown in FIG. 2, the television program recommender 200 may be embodied as any computing device, such as a personal computer or workstation containing a processor 202, such as a central processing unit (CPU), and memory 204, such as RAM and/or ROM. The television program recommender 200 may also be embodied as an application specific integrated circuit (ASIC), for example, in a set-top terminal or display (not shown). In addition, the television program recommender 200 may be embodied as any available television program recommender, such as the TIVO™ system, commercially available from Tivo, Inc., of Sunnyvale, Calif., or the television program recommenders described in "Method and Apparatus for Recommending Television Programming Using Decision Trees", U.S. patent application Ser. No. 09/466,406, filed Dec. 17, 1999; "Adaptive TV Program Recommender", U.S. patent application Ser. No. 09/498,271, filed Feb. 4, 2000; "Three-Way Media Recommendation Method and System", U.S. patent application Ser. No. 09/627,139, filed Jul. 27, 2000; or any combination thereof, each incorporated herein by reference, as modified herein to carry out the features and functions of the present invention.

In general, the television program recommender 200 develops parameter profiles, stored in memory 204, concerning the viewing habits of a user either implicitly, i.e., by analyzing the television programs viewed by the user and developing the parameter profiles, inclusive of television channel, genre, main actors/actresses, time of day, etc., or explicitly, i.e., in response to a user's answers to direct inquiries. In either case, the television program recommender 200 constructs the parameter profiles and uses these parameter profiles to calculate ratings for future television programs. However, as with all automated systems, the television program recommender 200 is not infallible. There is always the occasion that a television program that the user desires to watch is not recommended, or that a television program the user does not desire to watch is recommended. The subject invention is directed toward giving the user more control over modifying the settings of the television program recommender 200.

Figure 3A:
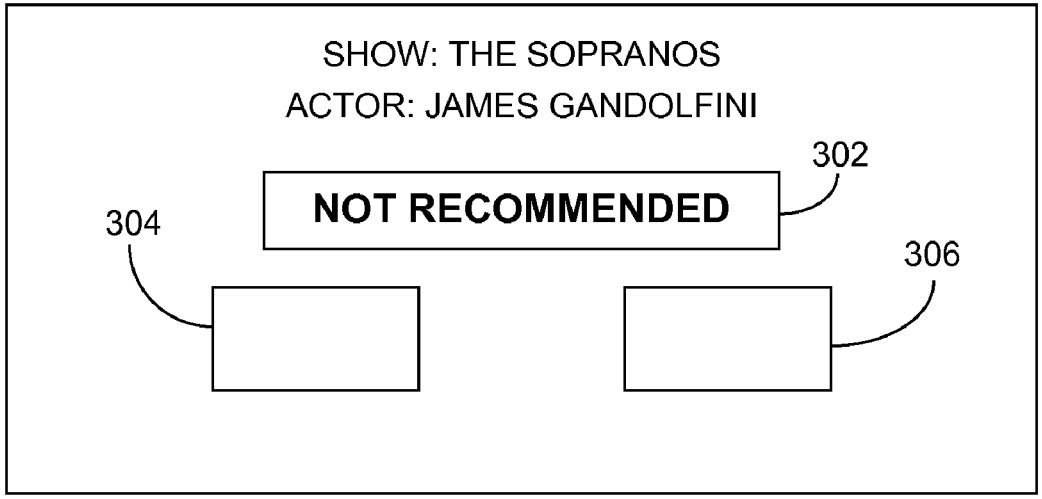
FIGS. 3A-3C show illustrations of displays showing the adjusting of the results from the television program recommender.

In particular, for any selected television program recalled from the database (EPG), the television program recommender 200 is able to calculate a rating based on the user's parameter profiles in various categories stored in the memory 204 and indicate whether that program is recommended. If desired by the user, the television program recommender 200 generates a graphical display showing the program title and whether or not it is recommended for the user. In addition, the television program recommender 200 enables the user to indicate whether he/she agrees or does not agree with the recommendation. As an example, FIG. 3A shows such a display for the HBO series "The Sopranos", starring James Gandolfini. Based on the determined parameter profiles of the user, the television program recommender 200 does not recommend (302) this program for viewing by the user. However, suppose, for instance, that the user finds these types of programs desirable. The question now is how can the user modify the settings of the television program recommender 200 such that it will, in the future, recommend these types of programs.

As shown in FIG. 3A, the display includes icons entitled "AGREE" 304 and "DISAGREE" 306 selectable by the user using a cursor control (not shown). If the user selects the AGREE icon 304, the television program recommender 200 augments the parameter profiles accordingly and similar programs again will not be recommended. If the user selects the DISAGREE icon 306, again the television program recommender 200 will modify the parameter profiles. However, it still is not certain whether in the future, similar (or the same) program will be recommended (or not recommended), in that the current recommendation may be the result of numerous user selections in the past and the changing of one recommendation may not be sufficient to change the overall recommendation by the television program recommender 200.

Figure 3B:
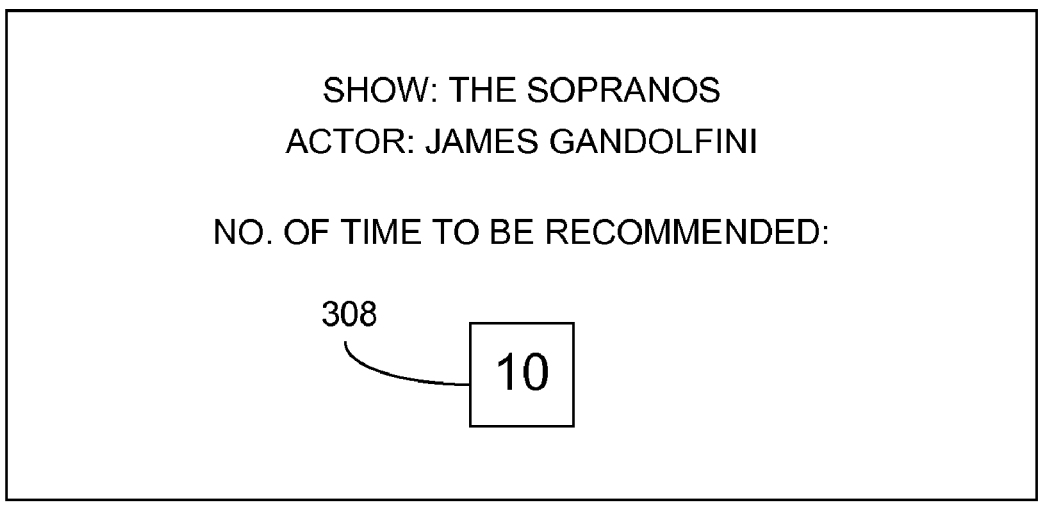

To that end, in response to the user selecting the DISAGREE icon 306, the television program recommender 200 calculates how many more times the user's desires for either the selected program or similar programs needs to be recorded in order for the television program recommender 200 to make recommendations corresponding to the user's current desires. Then, as shown in FIG. 3B, the television program recommender 200 displays the number of times in a window 308 in a second graphic display. As shown in this example, this number is 10. As such, the user may then select this or future episodes of "The Sopranos" and indicate that he/she disagrees with the recommendation for 10 consecutive times, at which point, the television program recommender 200 will change its recommendation accordingly.

Figure 3C:
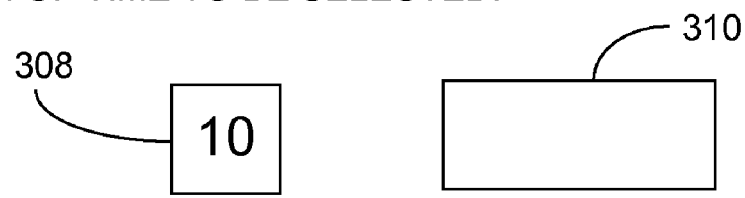

While this will give the user further control over the television program recommender 200, it may be tedious for the user to repeatedly select the program and indicate his/her disagreement with the recommendation of the television program recommender 200. To alleviate this, as shown in FIG. 3C, the second graphic display includes a further icon "AUTO SELECT?" 310 selectable by the user (again using a cursor control) enabling the user to authorize the television program recommender 200 to indicate the user's desires for the selected program for the indicated number of times.

Figure 4:
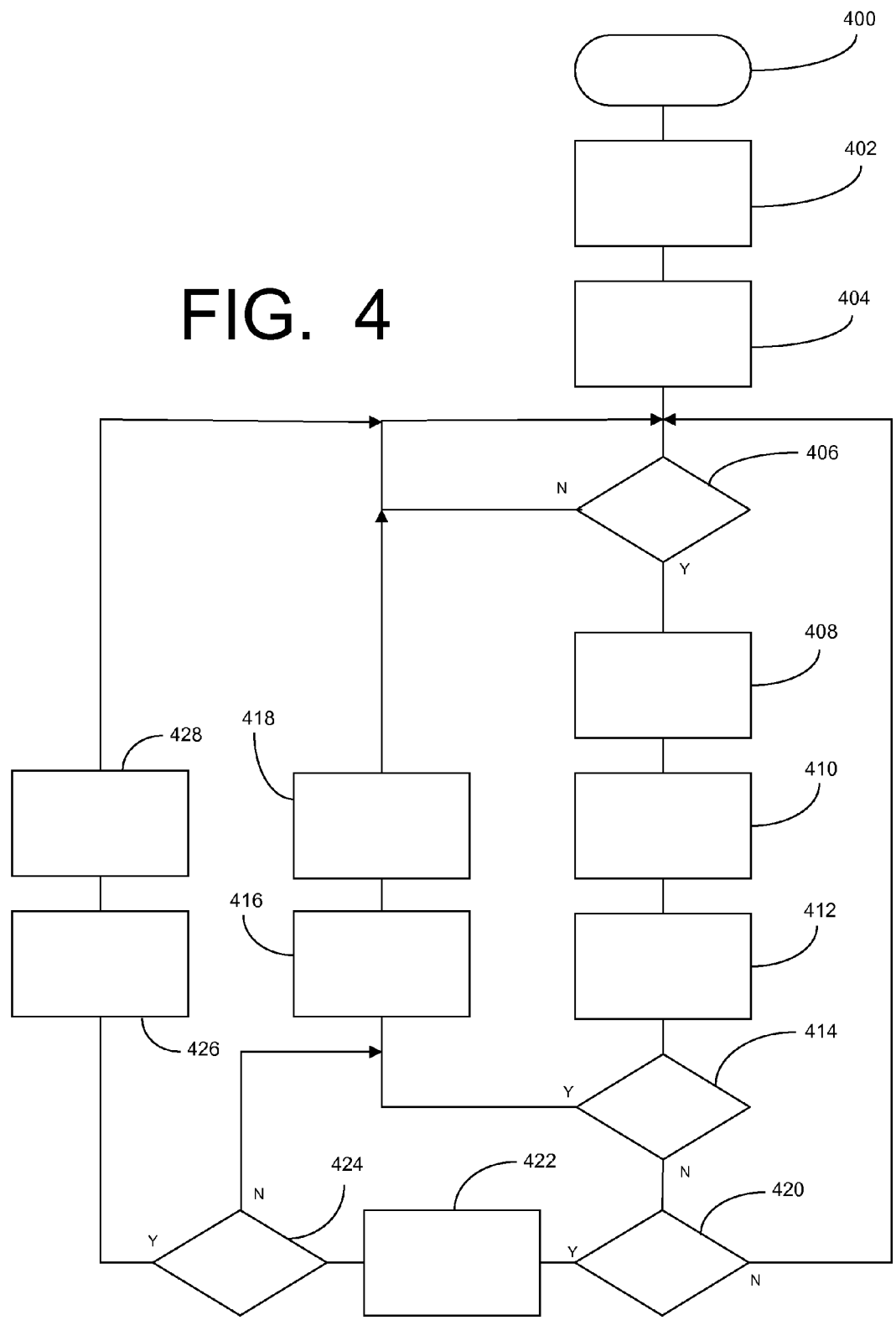
FIG. 4 shows a flowchart illustrating the method of the invention.

FIG. 4 shows a flowchart illustrating the method of the invention. From a start 400, at step 402, the television program recommender 200 generates the profile parameters for the user based on the user's past viewing habits. At step 404, the television program recommender 200 stores the profile parameters in memory 204. At step 406, it is checked whether the user has selected a program. If not, the flowchart loops back to step 406. If the user has selected a program, the CPU 202 calculates a rating for the selected program in step 408 based on the stored profile parameters. In addition, in step 410, the CPU 202 determines a recommendation indicating whether the selected program is recommended. Next, in step 412, the television program recommender 200 displays the recommendation 302, and the AGREE/DISAGREE icons 304 and 306. At step 414, it is checked whether the user has selected the AGREE icon 304. If so, the parameter profiles are modified at 416 and, in step 418, the modified parameter profiles are stored. The flowchart then goes back to step 406. If, in step 414, the user did not select the AGREE icon 304, in step 420, it is checked whether the user has selected the DISAGREE icon 306. If not, the flowchart loops back to the step 406. If so, at step 422, the CPU 202 determines the number of times the program needs to be selected and displays that number in window 308. In step 424, it is checked whether the user has selected the AUTO SELECT icon 310. If not, the flowchart then goes to step 416. If so, the CPU 202, in step 426, modifies the parameter profiles accordingly and saves the modified parameter in step 428. The flowchart then loops back to step 406.

The user is thus able to adjust the parameter profiles of the television program recommender 200 such that it will now recommend at least the types of programs for which the user has indicated a desire to watch.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A method for controlling a program recommender, comprising the steps of:
   generating and storing, using a processor and a memory, parameter profiles in various categories concerning a user's likes and dislikes in programming;
   calculating, using the processor, a rating for a selected program based on said parameter profiles in said various categories;
   determining, using the processor, a recommendation indicating whether or not said selected program is recommended based on said rating;
   displaying said recommendation;
   enabling a user to select whether a desire of said user agrees with said recommendation;
   modifying, using the processor, said parameter profiles based on said user's selection; and
   if said user's desire differ from said recommendation, determining, using the processor, and displaying a number of times the user needs to indicate said desire for said selected program in order for said program recommender to conform said recommendation to the desire of said user.

2. The method as claimed in claim 1, wherein said method further comprises the step:
   enabling the user, via the processor, to instantaneously indicate said desire for said selected program for said number of times.

3. An apparatus for controlling a program recommender, comprising:
   a program recommender for generating and storing parameter profiles in various categories concerning a user's likes and dislikes in programming, for
   calculating a rating for a selected program based on said parameter profiles in said various categories, and for
   determining a recommendation indicating whether or not said selected program is recommended based on said rating;
   a display;
   an on-screen display processor;
   a video switch;
   a controller for controlling said on-screen display processor and said video switch to display said recommendation on said display;
   said controller and said program recommender effecting a user interface enabling a user to select whether a desire of said user agrees with said recommendation;
   said program recommender modifying said parameter profiles based on said user's selection; and
   said program recommender determining and displaying on said display, a number of times the user needs to indicate said desire for said selected program, if said user's desire differ from said recommendation, in order for said program recommender to conform said recommendation to the desire of said user.

4. The apparatus as claimed in claim 3, wherein said arrangement further comprises:
   said controller and said program recommender being arranged to enable the user to instantaneously indicate said desire for said selected program for said number of times.

* * * * *